United States Patent
Knowles et al.

(10) Patent No.: US 7,429,113 B2
(45) Date of Patent: Sep. 30, 2008

(54) THIN, NEARLY WIRELESS ADAPTIVE OPTICAL DEVICE

(75) Inventors: Gareth Knowles, Williamsport, PA (US); Eli Hughes, Williamsport, PA (US)

(73) Assignee: QorTek, Inc., Williamsport, PA (US)

( * ) Notice: Subject to any disclaimer, the term of this patent is extended or adjusted under 35 U.S.C. 154(b) by 27 days.

(21) Appl. No.: 11/900,088

(22) Filed: Sep. 10, 2007

(65) Prior Publication Data

US 2008/0007851 A1 Jan. 10, 2008

Related U.S. Application Data

(62) Division of application No. 10/872,974, filed on Jun. 21, 2004, now Pat. No. 7,281,808.

(60) Provisional application No. 60/480,445, filed on Jun. 21, 2003.

(51) Int. Cl.
*G02B 5/08* (2006.01)

(52) U.S. Cl. ..................... 359/846; 359/849

(58) Field of Classification Search ......... 359/223–226, 359/290, 291, 846, 849, 871, 872; 310/309
See application file for complete search history.

(56) References Cited

U.S. PATENT DOCUMENTS 5,936,757 A * 8/1999 Kim et al. ............ 359/224

\* cited by examiner

*Primary Examiner*—Euncha P Cherry
(74) *Attorney, Agent, or Firm*—Michael Crilly, Esq.

(57) ABSTRACT

A thin, nearly wireless adaptive optical device capable of dynamically modulating the shape of a mirror in real time to compensate for atmospheric distortions and/or variations along an optical material is provided. The device includes an optical layer, a substrate, at least one electronic circuit layer with nearly wireless architecture, an array of actuators, power electronic switches, a reactive force element, and a digital controller. Actuators are aligned so that each axis of expansion and contraction intersects both substrate and reactive force element. Electronics layer with nearly wireless architecture, power electronic switches, and digital controller are provided within a thin-film substrate. The size and weight of the adaptive optical device is solely dominated by the size of the actuator elements rather than by the power distribution system.

6 Claims, 8 Drawing Sheets

THIN, NEARLY WIRELESS ADAPTIVE OPTICAL DEVICE

CROSS REFERENCE TO RELATED APPLICATIONS

This application is a divisional application of co-pending U.S. Non-Provisional application Ser. No. 10/872,974, filed Jun. 21, 2004 now U.S. Pat. No. 7,281,808, and claims benefit of U.S. Provisional Application No. 60/480,445, filed Jun. 21, 2003. The subject matters of the prior applications are incorporated in their entirety herein by reference thereto.

FEDERALLY SPONSORED RESEARCH AND DEVELOPMENT

One or more of the inventions disclosed herein were supported, at least in part, by grants from the National Aeronautics and Space Administration, (NASA) under Contract No. NAS5-03014 awarded by NASA, Goddard Space Flight Center and Contract No. 1234082, awarded by the California Institute of Technology Jet Propulsion Laboratory (JPL) as a subcontract under JPL's NASA prime contract. The Government has certain limited rights to at least one form of the invention(s).

BACKGROUND OF THE INVENTION

1. Field of the Invention

The present invention generally relates to adaptive optics. Specifically, the invention is a device wherein the shape of an optical element is altered via an array of actuators controlled by a power distribution network. The power distribution network includes a matrix architecture having a high-speed microcontroller, digital signal processor, or field programmable gate array therein.

2. Description of the Related Art

Active and adaptive optics refer to optical systems that dynamically modulate the shape of a mirror in real time to compensate for atmospheric conditions and/or variations along or within an optical material. For example, adaptive optics may compensate for atmospheric turbulence so that very faint objects may be imaged in long exposures. In another example, adaptive optics may compensate for variations along or within an optical material related to defects or changes resulting from motion, gravity, and temperature. Adaptive optics offer image quality approaching the theoretical diffraction limit. One advantage of adaptive optics is that fainter objects can be detected and studied when light levels are very low.

An adaptive optics system includes an element, usually a deformable mirror, to restore a wavefront by applying a canceling distortion based upon the shape of the distorted wavefront. Exemplary adaptive optics systems use a point source of light, one example being a star, as a reference to probe the shape of a wavefront. Light from the reference source is analyzed by a sensor and commands are communicated to a mechanical device which alters the surface of a deformable mirror to provide the necessary compensations. An adaptive optics system must adjust the shape of an optical element at least several hundred times per second to effectively remove atmospheric distortions and/or variations along an optical surface so as to achieve the best possible image quality.

The application of active material actuators, including PMN and PZT elements, requires precise control of multiple actuators within an array. Precise control is directly related to the power delivery method.

Power control approaches are known within the art whereby small charge packets are used to control actuators. This approach offers both efficient power-to-mechanical-force conversion and very high resolution or accuracy. However, devices employing this approach are inherently gain-bandwidth product limited due to the reliance on small charge packets. As such, this approach does not adequately correct distortions and variations encountered by many optical systems.

Power control approaches are also known within the art whereby each actuator is assigned a power amplifier so as to allow for the separate control of all actuators within an array. However, several deficiencies prohibit practical implementations of this approach. First, the complexity and size of conventional wiring buss designs increase with actuator density, thereby causing electromagnetic interference, radio frequency interference, and capacitive loss problems. Second, the size and complexity of the power electronics prohibit actuator densities required to adequately control a contiguous optical element.

What is currently required is an adaptive optics system having a power distribution and control system which avoids the problems of the related arts while providing a compact, affordable and reliable solution.

SUMMARY OF INVENTION

An object of the present invention is to provide a thin, nearly wireless adaptive optical device capable of dynamically modulating the shape of a mirror in real time to compensate for atmospheric distortions and/or variations along an optical material.

In the present invention, "matrix" refers not only to the physical arrangement of actuators but also to the logical interconnection of actuators to each other and to the use of a single controller to communicate information to each actuator within an array. The present invention allows each actuator to be independently controlled. Each actuator receives a command signal having a frequency, amplitude and phase unique to that actuator which may differ from that of the surrounding actuators. As such, each actuator may be commanded to an absolute position unique from surrounding actuators.

The present invention comprises an optical layer, a substrate, at least one electronic circuit layer with nearly wireless architecture, an array of actuators, power electronic switches, and a reactive force element. Whereas, the size and weight of adaptive systems within the related arts are dictated by their power electronics and wiring system, the present invention is solely dominated by the size of the actuator elements.

The optical layer, one example being a mirror, forms the outermost surface of the adaptive optics device. The optical layer is directly bonded, embedded, deposited or otherwise coupled onto one surface of a substrate. The substrate supports the optical layer and is composed of a flexible material, one example being a graphite-fiber composite.

An electronics layer with nearly wireless matrix architecture may be bonded, embedded, or otherwise coupled onto a first surface of the substrate opposite of the optical layer. The electronics layer is electrically isolated from the substrate. A second surface of the electronics layer contacts and may be bonded to one end of each actuator thereby providing electrical connectivity with and between actuators. The electronics layer should be sufficiently flexible so as to allow deformation of the substrate and optical layer. Circuitry for electrical connectivity is applied onto the electronics layer via known methods including etching, printing and deposition. Thin-film methods are used to deposit complex electronics onto the electronics layer directly so as to allow for processing on the electronics layer. Thin-film architecture is preferred since it allows for a more compact and lightweight device.

Power electronic switches reside on the electronics layer as an integral part of the matrix architecture. Exemplary switches include thin-film transistors and discrete semiconductors. Power electronic switches sequence system power supplies to more efficiently distribute command and control to the actuators. One or more power amplifiers may also be provided to scan through the array to continuously update the array of actuators.

Actuators are coupled to an electronics layer so as to communicate the matrix architecture circuitry thereto. Each actuator is bonded to a power distribution location within the thin electronics layer. Several embodiments are possible for switch control. For example, a power switch may be disposed adjacent to each actuator along the electronics layer. Alternately, a power switch may be disposed adjacent to each row and column or row only or column only.

The second end of each actuator contacts or is fixed to a reactive force element which resists both expansion and contraction of actuators so as to communicate actuator displacement into the substrate and thereafter into the optical surface so as to cause deflection thereof. The actuators may be any suitable piezo-based material, examples including PMN and PZT, capable of communicating force onto the optical surface in order to cause displacement in a particular location and direction. Actuators may be arranged in an array or other suitable configuration so as to ensure deformation control anywhere along the substrate and into the optical layer.

A second electronics layer with nearly wireless matrix architecture may be bonded, embedded or otherwise coupled to the second end of each actuator and reactive force element opposite of the actuators so as to expose the matrix architecture. The second electronics layer contacts and is bonded to one end of each actuator in the array so as to provide electrical connectivity to and between actuators. The electronics layer may be flexible, semi-rigid, or rigid. In some embodiments, it may be preferred to have power electronic switches as described above. One or both electronics layers may be integrated within a single adaptive optical device.

A digital controller resides on each electronics layer so as to receive external commands and to communicate control signals to amplifiers and power switches within the matrix architecture to effect actuator positions. External commands are communicated via digital communications links, including but not limited to Ethernet, USB, FireWire, and RS-232. The digital controller is implemented as a microcontroller, microprocessor, digital signal processor or field programmable gate array on the electronics layer.

The adaptive functionality of the present invention facilitates the adjustment of charge to one or more actuators in response to optical measurements to achieve a desired profile along the optical element. The baseline optical profile may be achieved with all, some, or none of the actuators charged. The charge and discharge of actuators in the array permits adjustments to and refinements of the optical profile about the baseline.

The present invention has two noteworthy advantages. The matrix architecture of the present invention eliminates a wiring buss, thereby increasing the effective bandwidth of actuators communicating with the substrate. The size and weight of the present invention is solely dominated by the size of the actuator elements thereby providing a compact, thin and lightweight solution.

Figure 1:
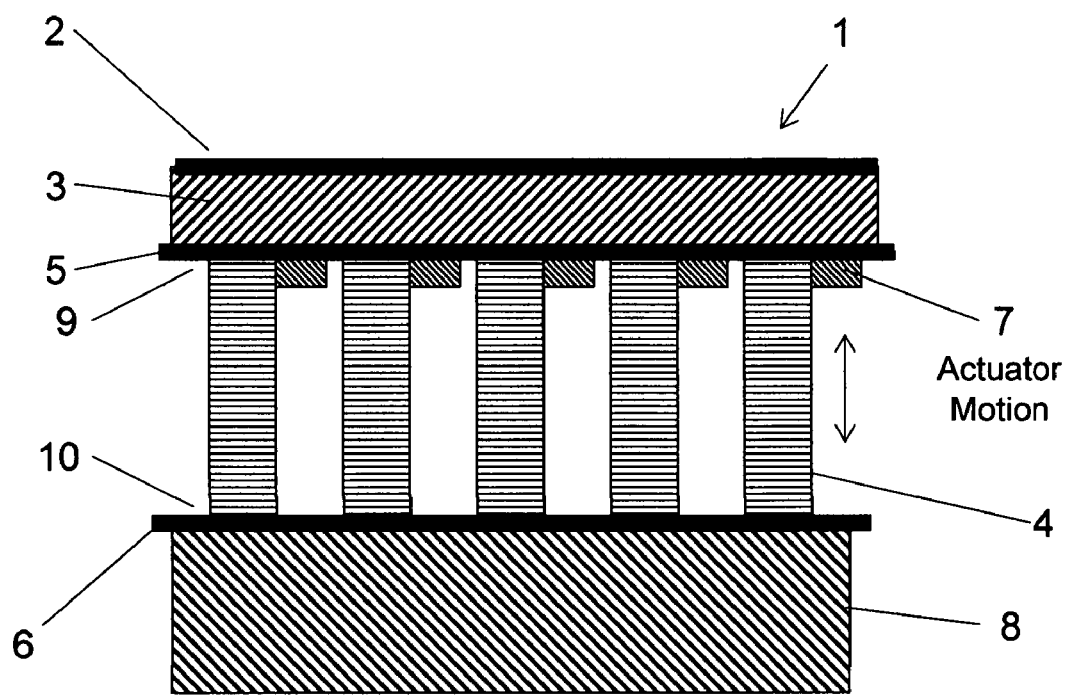
FIG. 1 is a cross section view of the present invention showing a plurality of actuators disposed between a pair of electronics layers wherein one electronics layer contacts a reactive force element and a second optional electronics layer contacts a substrate having an optical layer thereon.

| REFERENCE NUMERALS | |
|---|---|
| 1 | Adaptive optical device |
| 2 | Optical layer |
| 3 | Substrate |
| 4 | Actuator |
| 5 | First electronics layer |
| 6 | Second electronics layer |
| 7 | Power switch |
| 8 | Reactive force element |
| 9 | First end |
| 10 | Second end |
| 11 | Matrix architecture |
| 12 | Power switch |
| 13 | Ground |
| 14 | Synthetic impedance drive |
| 15 | Digital controller |
| 16 | Column |
| 17 | Row |
| 18 | Ground |
| 19 | Low-leakage power switch |
| 20 | Gate Drive |
| 21 | Peg |
| 22 | Actuator |
| 23 | Head |
| 24 | Electrical contact |
| 25 | Reactive force element |
| 26 | Hole |
| 27 | Diode |
| 28 | MOSFET switch |
| 29 | Electronics layer |
| 30 | Conductive pathway |
| 31 | Row |
| 32 | Column |
| 33 | Electrical contact |

DETAILED DESCRIPTION OF THE INVENTION

Referring now to FIG. 1, an exemplary array of vertically disposed actuators 4 are arranged between a horizontally disposed reactive force element 8 and substrate 3. While five actuators 4 are shown in FIG. 1, it is possible to have an unlimited variety of actuator 4 configurations and arrangements.

The substrate 3 is composed of a material that is sufficiently flexible so as to allow for deflection when acted upon by one or more actuators 4. While a variety of substrate 3 materials are possible, it is preferred that the coefficient of thermal expansion (CTE) of the substrate 3 closely match that of the optical layer 2 to minimize thermal induced distortions of the optical surface.

The substrate 3 has an optical layer 2 bonded, embedded, deposited or coupled to one surface and an optional first electronics layer 5 bonded, embedded, or coupled to a second surface opposite of the optical layer 2. For example, optical layer 2 and first electronics layer 5 may be bonded to the substrate 3 with an epoxy. It is likewise possible to apply the optical layer 2 via coating and sputtering methods understood in the art. It is preferred to have the first electronics layer 5 electrically isolated from the substrate 3. It is also preferred to have both optical layer 2 and first electronics layer 5 to be sufficiently flexible so as to compliment the shape of the substrate 3. The substrate 3 should maintain the shaped of the optical layer 2 in its deformed and non-deformed states. While a planar shaped substrate 3 is described in FIG. 1, a variety of cross sections are possible, including concave, convex, as well as combinations and variations thereof.

The reactive force element 8 is composed of a material, examples including titanium and composite, sufficiently rigid so as to resist deflection when acted upon by one or more actuators 4. The reactive force element 8 has an optional second electronics layer 6 bonded, embedded, or coupled to a surface to one surface. It is preferred to have the second electronics layer 6 electrically isolated from the reactive force element 8. In some embodiments, it may be advantageous to have the reactive force element 8 match the shape of the substrate 3 and/or optical layer 2.

First electronics layer 5 and second electronics layer 6 are electrically exposed opposite of their respective mountings so as to electrically contact the actuators 4 thereon. Several embodiments are possible for the first electronics layer 5 and second electronics layer 6. For example, the first electronics layer 5 may be adhesively or mechanically attached to the first end 9 of each actuator 4 and the second end 10 of each actuator 4 contacting, adhesively bonded or mechanically attached to the reactive force element 8. It is likewise possible for the first electronics layer 5 to be adhesively or mechanically attached to the first end 9 of each actuator 4 and the second end 10 of each actuator 4 to be adhesively or mechanically attached to the second electronics layer 6 residing along the reactive force element 8. It is also possible for each actuator 4 to be adhesively or mechanically attached to the second electronics layer 6 along the reactive force element 8 at the second end 10 and contacting, adhesively bonded, or mechanically attached to the substrate 3 at the first end 9.

Proper contact between actuators 4 and electronics layers 5, 6 is required to ensure electrical interconnectivity to and between actuators 4 within an array. It was preferred to adhesively bond each actuator 4 to an electrical layer 5, 6 via a conductive epoxy. However, it was possible to attach actuators 4 to one or both electronics layers 5, 6 directly via known soldering and bonding methods compatible with PVDF and acrylic.

Figure 4:
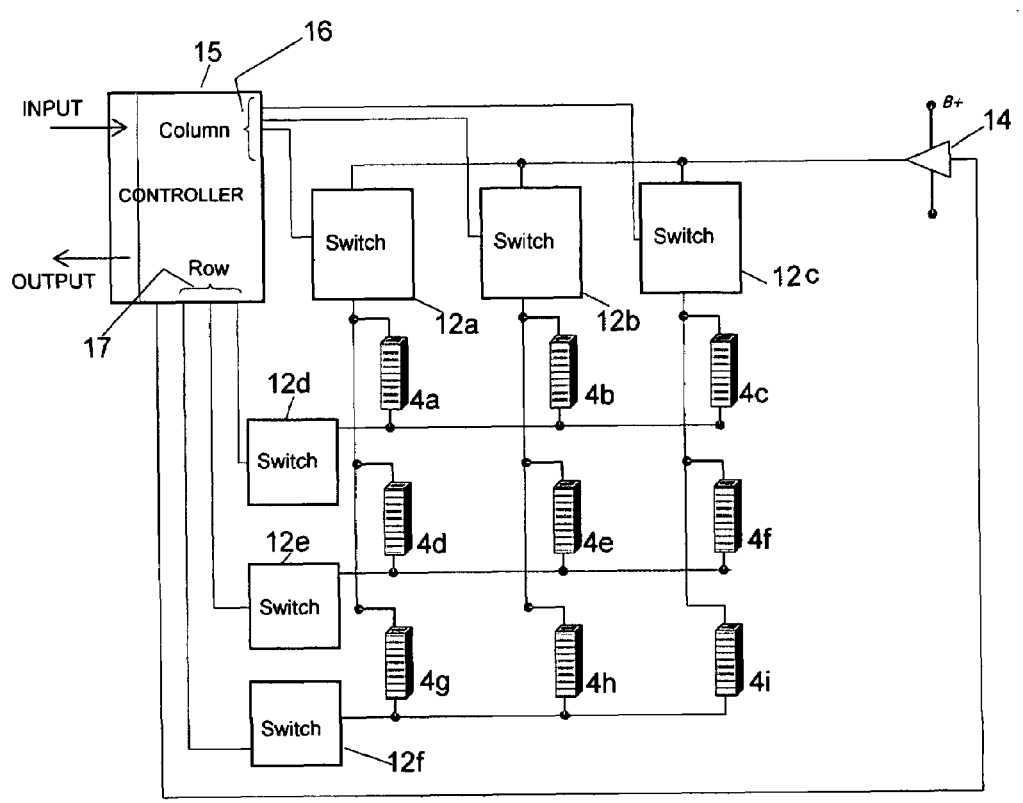
FIG. 4 is a schematic diagram showing matrix architecture with switch elements at each row and column end.
Figure 5:
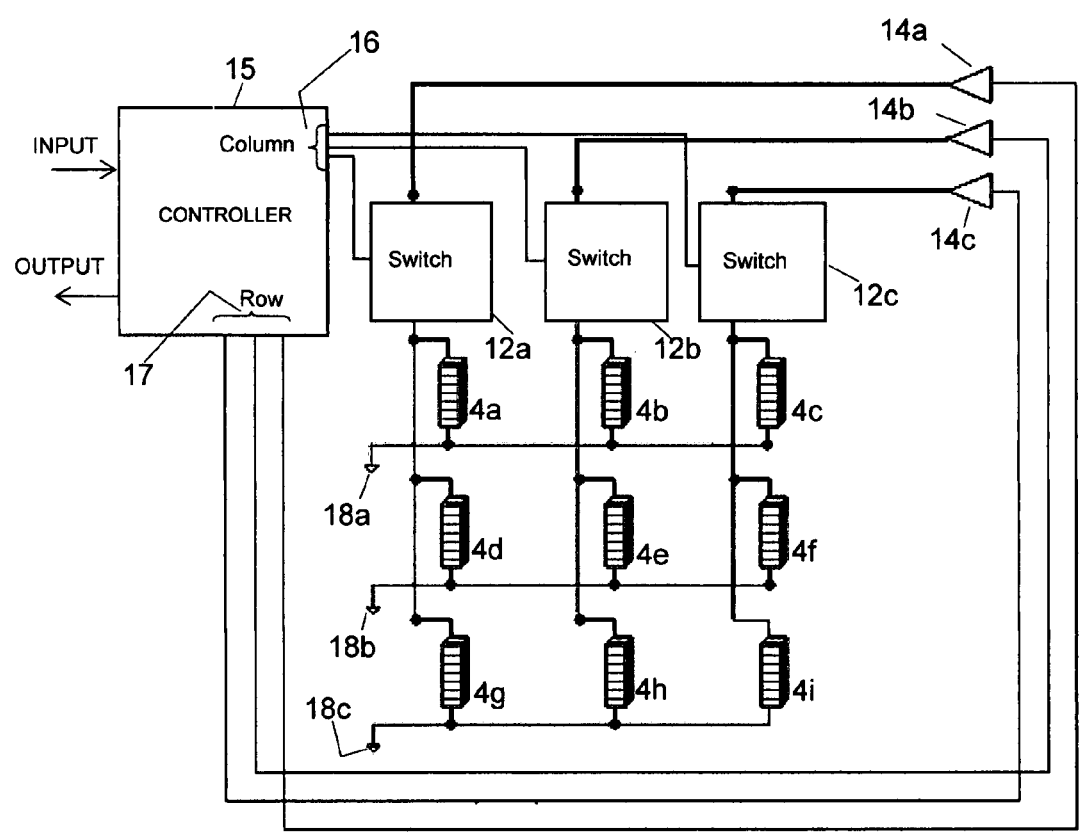
FIG. 5 is a schematic diagram showing matrix architecture with switch elements at each column end only.

First electronics layer 5 and second electronics layer 6 interconnect the digital controller 15 to the actuators 4a-4i, as represented in FIGS. 4 and 5, so as to control charge flow thereto and therefrom. Both electronics layers 5, 6 are comprised of a thin-film structure having a trace architecture and a plurality of power switches 12a-12f, as represented in FIG. 4. The thin-film is a rigid, semi-rigid, and flexible planar-disposed material, including but not limited to glass, Kapton and polymer-based compositions. The trace architecture may be implemented with a variety of standard etching techniques, thin-film deposition methods, photolithography or printing techniques understood in the art. Power switches 7, as in FIG. 1, 12a-12f, as in FIG. 4, and 12a-12c, as in FIG. 5, are embedded within or onto the thin-film. Exemplary switch devices include but are not limited to MOSFET, BJT, JFETs, MEM switches/relays, and thin-film transistors.

Figure 2:
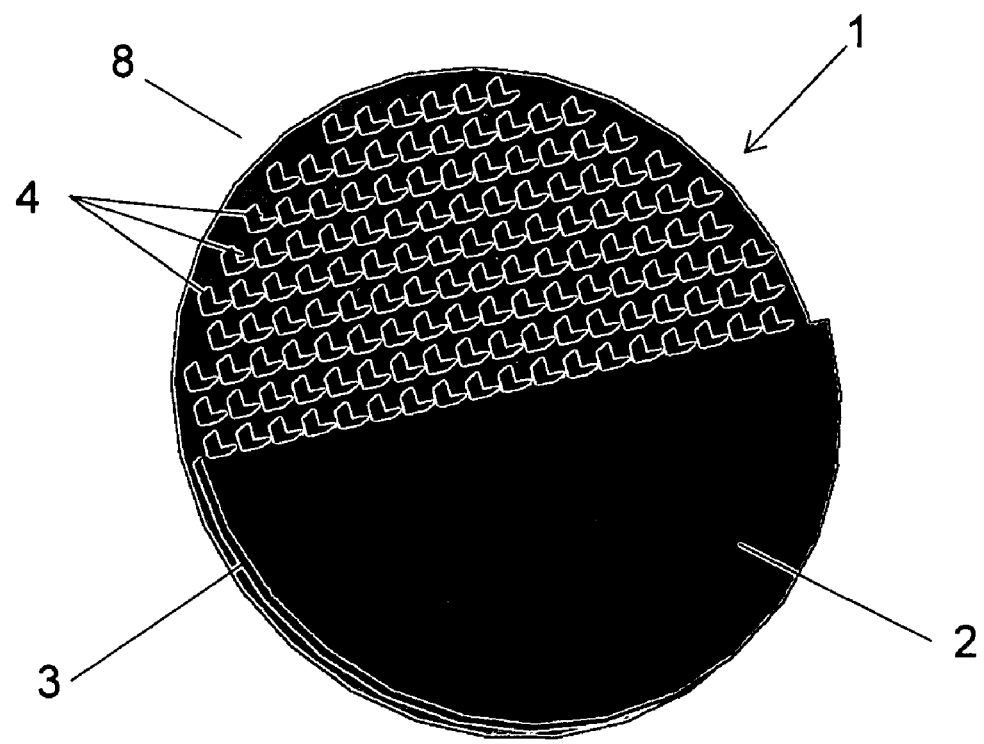
FIG. 2 is a perspective view of an exemplary circular shaped adaptive optical device with a partial section view showing arrangement of actuator elements along one surface of the reactive force element.

Referring now to FIG. 2, an exemplary embodiment of the adaptive optical device 1 is shown having a plurality of actuators 4 residing on a circular reactive force element 8. A portion of the substrate 3 is removed to show an exemplary arrangement of actuators 4 contacting the substrate 3 and controlling the optical layer 2 thereon. Actuators 4 are chosen from a wide variety of materials, including but not limited to piezoelectrics, ferroelectrics (e.g., PZT and PMN), micro-electro-mechanical systems (MEMS), and polymerics (e.g., PVDF or acrylic). Actuators 4 are aligned between substrate 3 and reactive force element 8 so that each axis of expansion and contraction bisects both substrate 3 and reactive force element 8. It was also preferred that actuators 4 expand or contract in a rapid fashion when electrically activated so as to achieve real time deflection of the optical layer 2.

Matrix Switch Architecture

Figure 3:
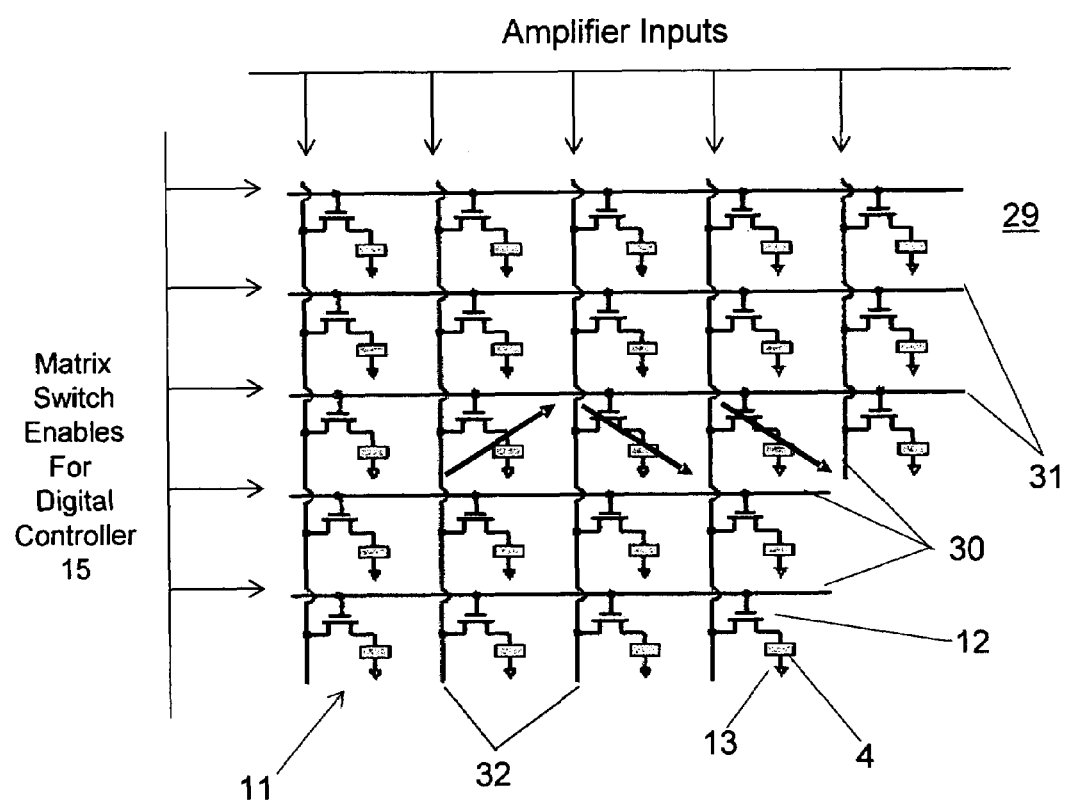
FIG. 3 is a schematic diagram of the matrix architecture within an exemplary electronics layer showing individual switch elements at each junction.

Referring now to FIG. 3, electronics layer 29 and power switches 12 constitute the matrix architecture 11 allowing for efficient electrical connectivity to control large arrays of densely packed actuators 4. Several implementations of the matrix architecture 11 are possible.

In the embodiments described hereafter, micro-controllers, digital signal processors, or FPGAs are embedded within the matrix architecture 11 to control individual actuators 4. For example, a micro-controller may enable an external host to communicate commands to a matrix circuitry and receive feedback and status information from the control matrix via wire and wireless means. Furthermore, micro-controllers, digital signal processors, or FPGAs may be used for remote charge control and processing algorithms. While specific array configurations and sizes are shown and described in FIGS. 3-5, the present invention is not limited thereto.

First Implementation

Referring again to FIG. 3, the matrix architecture 11 is shown having a grid-wise arrangement of conductive pathways 30 forming "m" rows 31 and "n" columns 32. At each intersection of a row 31 and column 32, a power switch 12 is electrically connected to a conductive pathway 30 having a charge from an external power amplifier, in this example along a column 32, and a conductive pathway 30 having a command, in this example along a row 31, to control the power switch 12. Each power switch 12 is thereafter electrically connected to an actuator 4 and terminated to ground 13. The total number of power switches 12 and actuator 4 pairs is the product (m×n) of the number of rows 31 and the number of columns 32.

A digital controller 15 dynamically selects one or more rows 31 to be activated and commands one or more power amplifiers to charge/discharge one or more actuators 4 along the selected one or more rows 31. When ON, the power switch 12 communicates charge flow from the power amplifier along the conductive pathway 30 in a column 32 to the actuator 4 electrically connected to the power switch 12 within the desired row 31. The digital controller 15 actively scans all rows 31 to continuously refresh actuators 4 with charge. A variety of electrical connectivity schemes are possible for the described embodiment including a three-wire interface to the system with power, ground and digital command signal or a wireless digital protocol, one example being 802.11b. The latter further simplifies electrical connectivity to power and ground connections.

Power switches 12 may be directly fabricated onto a thin-film via several techniques. For example, an array of TFTs may be etched or printed via photolithography during the course of transcribing the matrix architecture 11. Alternatively, individual power switches 12 may be attached as tiny discrete transistors thereby providing a far more flexible structure. In this latter embodiment, paper-thin MOSFET dyes are bonded or otherwise attached to the thin-film and thereafter coated with an epoxy.

Second Implementation

Referring now to FIG. 4, an alternate embodiment of the present invention is shown and described wherein the number of power switches 12 is equal to the sum (m+n) of number of columns 16 and the number of rows 17 comprising the array of actuators 4.

In this embodiment, each actuator 4 is electrically connected to two power switches 12. Column-wise disposed actuators 4a-4d-4g, 4b-4e-4h, and 4c-4f-4i are electrically connected to a power switch 12a, 12b, and 12c, respectively, as shown in FIG. 4. Row-wise disposed actuators 4a-4b-4c, 4d-4e-4f, and 4g-4h-4i are likewise electrically connected to power switches 12d, 12e, and 12f, respectively, as shown in FIG. 4. All power switches 12a-12f are thereafter electrically connected to a digital controller 15 according to the column-wise and row-wise arrangements described above. A single synthetic impedance drive 14 is electrically connected to the digital controller 15 and thereafter to each power switch 12a-12c communicating to the column-wise disposed actuators 4a-4d-4g, 4b-4e-4h, and 4c-4f-4i.

The digital controller 15 communicates charge to one or more actuators 4a-4i within the array via the paired command of column switches 12a-12c and row switches 12d-12f. Again, the digital controller 15 scans all actuators 4a-4i and updates each with the desired charge. It is possible for several actuators 4a-4i within a single row or column to be updated at once.

Third Implementation

Referring now to FIG. 5, another embodiment of the present invention is shown and described in which the number of switches 12 is equal to the number of columns 16 or rows 17 at which switches 12 are provides. The number of synthetic impedance drives 14 is equal to the total number of switches 12.

In this embodiment, each actuator 4 is electrically connected to one power switch 12. For example, column-wise disposed actuators 4a-4d-4g, 4b-4e-4h, and 4c-4f-4i are electrically connected to a power switch 12a, 12b, and 12c, respectively, as shown in FIG. 5. Row-wise disposed actuators 4a-4b-4c, 4d-4e-4f, and 4g-4h-4i are electrically terminated to ground 18a, 18b, and 18c, respectively. Power switches 12a-12c are thereafter electrically connected to a digital controller 15 according to the column-wise arrangement described above. Synthetic impedance drives 14a, 14b, and 14c are electrically connected to the digital controller 15 and thereafter to each power switch 12a, 12b, and 12c, respectively.

The digital controller 15 communicates charge to the column-wise actuators 4a-4d-4g, 4b-4e-4h, and 4c-4f-4i within the array via the individual command of each column switch 12a-12c. Again, the digital controller 15 scans all actuators 4a-4i and updates each with the desired charge. Actuators 4a-4i within one or more columns 16 may be updated at once.

Matrix Switch Implementation

Although a variety of commercially available power switches 12 are applicable to the present invention, device selection is largely influenced by charge leakage characteristics and switching speeds.

Figure 6:
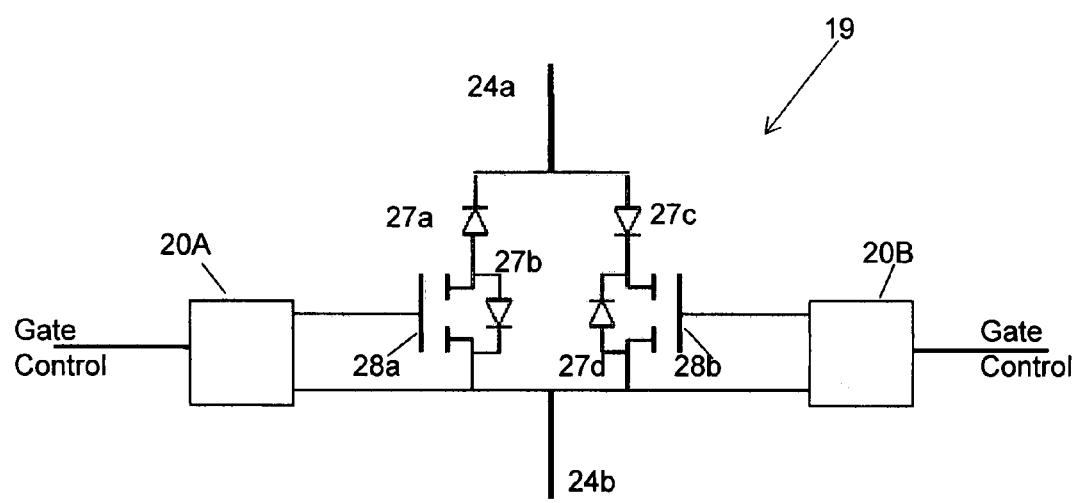
FIG. 6 is a schematic diagram of a low-leakage power switch having a dual gate drive arrangement.

Referring now to FIG. 6, a low-leakage power switch 19 is shown and described. The low-leakage power switch 19 includes two MOSFET switches 28a and 28b each electrically connected to a gate drive 20a and 20b, respectively, and thereafter electrically connected to a gate control. Each MOSFET switch 28a and 28b is electrically connected to a blocking diode 27b and 27d, respectively, in a parallel arrangement and a second blocking diode 27a and 27c, respectively, in a series arrangement. The described circuit is arranged in parallel having electrical contacts 24a, 24b therefrom. Blocking diodes 27a-27d minimize leakage when each MOSFET switch 28a, 28b is OFF. Gate drives 20a, 20b (source references) control ON and OFF state of the MOSFET switches 28a, 28b. The digital controller 15 communicates a charge and discharge command to the described circuit. The described circuit may be embedded within the thin film structure of the matrix architecture 11.

Assembly of Actuators and Reactive Force Element

Figure 7:
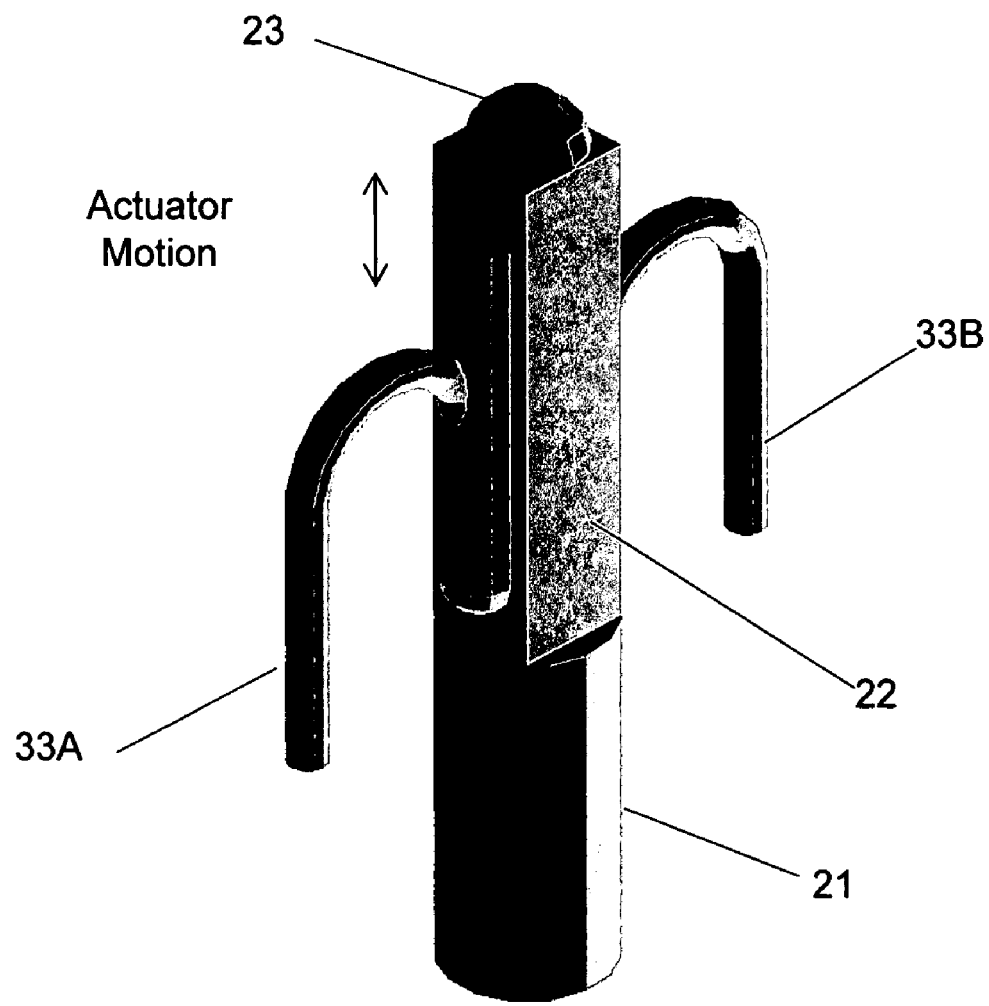
FIG. 7 is a perspective view of an exemplary actuator assembly used with a preferred approach for assembling the present invention.
Figure 8:
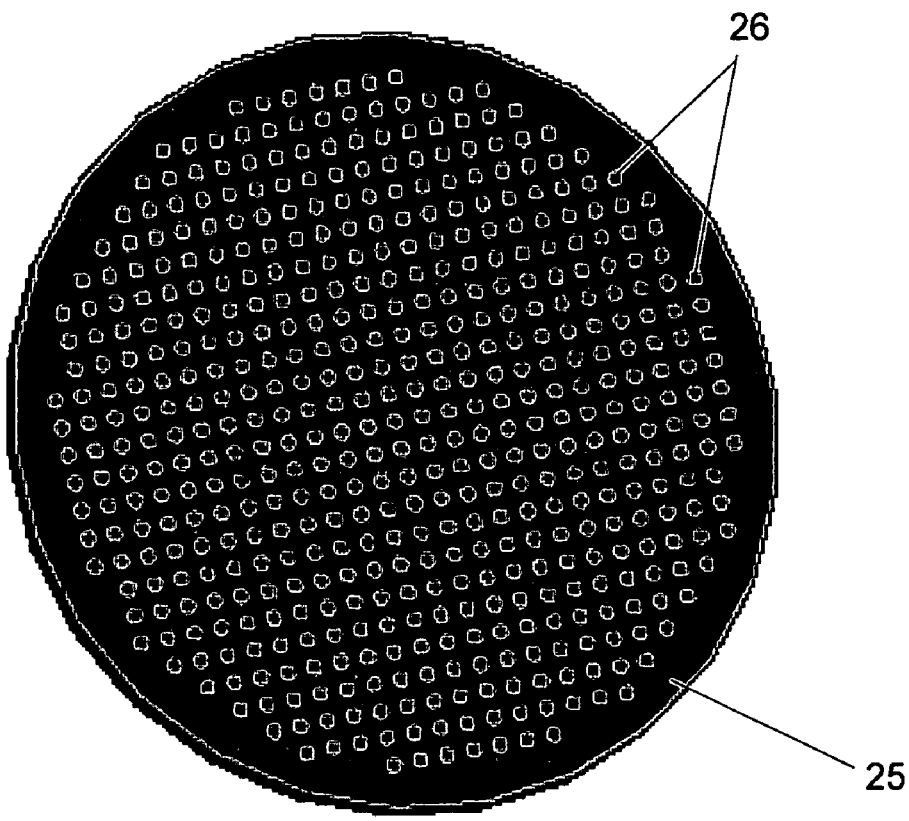
FIG. 8 is a view of a reactive force plate with a plurality of holes for use with actuators shown in FIG. 7.

In preferred embodiments, actuators 4 may be secured to the reactive force element 8 via a peg 21 and hole 26 arrangement, as shown and described in FIGS. 7 and 8.

Referring now to FIG. 7, a peg 21 composed of a dimensionally stable material is adhesively bonded or mechanically attached to one end of the actuator 22. A head 23 is likewise adhesively bonded or mechanically attached at the other end of the actuator 22. The head 23, preferably a magnetic material, adheres to the back of the face sheet of the optical layer 2. The preferred magnetic attachment scheme maintains contact between optical layer 2 and actuator 22 and decouples out-of-plane forces during movement of the actuator 22. A pair of electrical contacts 33a and 33b, flexible and u-shaped, is electrically connected to the actuator 22. The described electrical contacts 33a, 33b accommodate any mismatch that might exist between actuator 22 and electronics layers 5, 6 during assembly.

Referring now to FIG. 8, a preferred embodiment of the reactive force element 25 is shown having a plurality of holes 26 completely or partially traversing the thickness of the element. Holes 26 were dimensionally toleranced so as to enable insertion of the peg 21 described above into the hole 26. Holes 26 are precisely located along the reactive force element 25 so as to precisely locate each actuator 22 within an array. It was preferred to have each hole 26 chamfered to facilitate a good epoxy bond.

The description above indicates that a great degree of flexibility is offered in terms of the present invention. Although the present invention has been described in considerable detail with reference to certain preferred versions thereof, other versions are possible. Therefore, the spirit and scope of the appended claims should not be limited to the description of the preferred versions contained herein.

The invention claimed is:

1. A thin, nearly wireless adaptive optical device comprising:
   (a) a flexible substrate;

(b) a flexible optical layer attached to one surface of said flexible substrate;

(c) a reactive force element;

(d) an electronics layer having a matrix architecture attached to said reactive force element and electrically isolated therefrom, said matrix architecture electrically exposed opposite of said reactive force element;

(e) a plurality of actuators composed of an electrically responsive material and having a first end and a second end, said actuators communicating with said flexible substrate opposite of said flexible optical layer at said first end, said actuators communicating with said matrix architecture within said electronics layer at said second end, each said actuator aligned so that expansion and contraction thereof intersects said flexible substrate and said reactive force element, said reactive force element resisting expansion and contraction of said actuators; and (f) at least one power switch communicating with said actuators along said electronics layer.

2. The thin, nearly wireless adaptive optical device of claim 1, wherein each said actuator having one said power switch electrically connected thereto, each said power switch disposed within said matrix architecture.

3. The thin, nearly wireless adaptive optical device of claim 1, wherein at least two said actuators having one said power switch electrically connected thereto, said power switch disposed within said matrix architecture.

4. The thin, nearly wireless adaptive optical device of claim 1, wherein at least two said actuator having two said power switches electrically connected thereto, said power switches disposed within said matrix architecture.

5. The thin, nearly wireless adaptive optical device of claim 1, further comprising:

(g) a digital controller disposed within said matrix architecture, said digital controller having an I/O interface for receiving control commands and communicating optical state information.

6. The thin, nearly wireless adaptive optical device as in one of claims 1-5, wherein said power switch compromises a pair of MOSFET switches each electrically connected to at least two blocking diodes and arranged to minimize charge leakage.

* * * * *